US010141094B2

(12) United States Patent
Ozana et al.

(10) Patent No.: US 10,141,094 B2
(45) Date of Patent: Nov. 27, 2018

(54) MOUNTING ARRANGEMENT FOR INDUCTIVE OUTLET

(71) Applicant: POWERMAT TECHNOLOGIES LTD., Neve Ilan (IL)

(72) Inventors: Charli Ozana, Or Akiva (IL); Yaniv Dayan, Tel Aviv (IL); Guy Glick, Gan Yavne (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 136 days.

(21) Appl. No.: 15/005,193

(22) Filed: Jan. 25, 2016

(65) Prior Publication Data

US 2017/0213632 A1 Jul. 27, 2017

(51) Int. Cl.

| | |
|---|---|
| ***H01F 27/00*** | (2006.01) |
| ***H01F 27/08*** | (2006.01) |
| ***H01F 27/02*** | (2006.01) |
| ***H01F 27/28*** | (2006.01) |
| ***H02J 5/00*** | (2016.01) |
| ***H01F 27/22*** | (2006.01) |
| ***H01F 38/14*** | (2006.01) |

(52) U.S. Cl.

CPC ........... *H01F 27/085* (2013.01); *H01F 27/00* (2013.01); *H01F 27/02* (2013.01); *H01F 27/22* (2013.01); *H01F 27/2823* (2013.01); *H01F 38/14* (2013.01); *H02J 5/005* (2013.01)

(58) Field of Classification Search

CPC ............................................ H01F 27/00–27/36
USPC .......... 336/55–62, 65, 90, 92, 200, 192, 232
See application file for complete search history.

(56) References Cited

FOREIGN PATENT DOCUMENTS

JP 2000308236 A * 11/2000

* cited by examiner

*Primary Examiner* — Tuyen Nguyen
(74) *Attorney, Agent, or Firm* — William Dippert; Laurence Greenberg; Werner Stemer

(57) ABSTRACT

A mounting arrangement for securing a wireless power outlet to an underside of a surface includes an electronics housing configured to contain therewithin components of the outlet and a coil housing. The coil housing is configured to contain a primary inductive coil of the outlet. The mounting arrangement further includes a heat sink configured to expel thermal energy from the primary inductive coil and a flexible thermal conductor.

6 Claims, 20 Drawing Sheets

MOUNTING ARRANGEMENT FOR INDUCTIVE OUTLET

FIELD OF THE INVENTION

The present disclosure relates to mounting arrangements for inductive outlets, and in particular those configured to mount an inductive outlet to the underside of a surface.

BACKGROUND OF THE INVENTION

The use of a wireless non-contact system for the purposes of automatic identification or tracking of items is an increasingly important and popular functionality.

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without a conductive connection between the inductors.

When electrical energy is transferred from a primary inductor to a secondary inductor, the inductors are said to be inductively coupled. An electric load wired in series with such a secondary inductor may draw energy from the power source wired to the primary inductor when the secondary inductor is inductively coupled thereto.

In order to take advantage of the convenience offered by inductive power coupling, inductive outlets having primary inductors may be installed in different locations that people typically use to rest their devices, such that they may be charged while at rest.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION OF EMBODIMENTS

Figure 1:
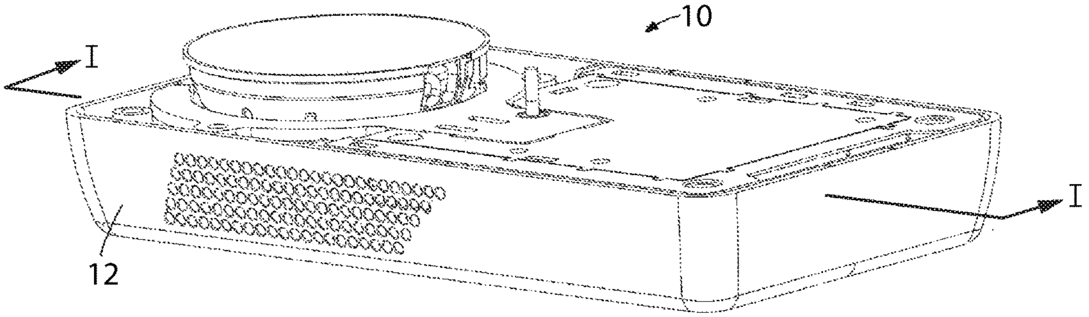
FIG. 1 is a perspective view of an example of a mounting arrangement according to the presently disclosed subject matter.

As illustrated in FIG. 1, there is provided a mounting arrangement, which is generally indicated at 10, and which is configured for facilitating mounting an inductive outlet to a surface (e.g., a tabletop, etc.). In particular, it is designed so as to keep a primary inductive coil of the inductive outlet at a predeteimined distance from the top face of the surface. The distance takes into account the optimal distance between the primary inductive coil and a secondary inductive coil of an inductive receiver, as well as the distance that the secondary inductive coil typically is when a device containing it lies on the surface.

Figure 2:
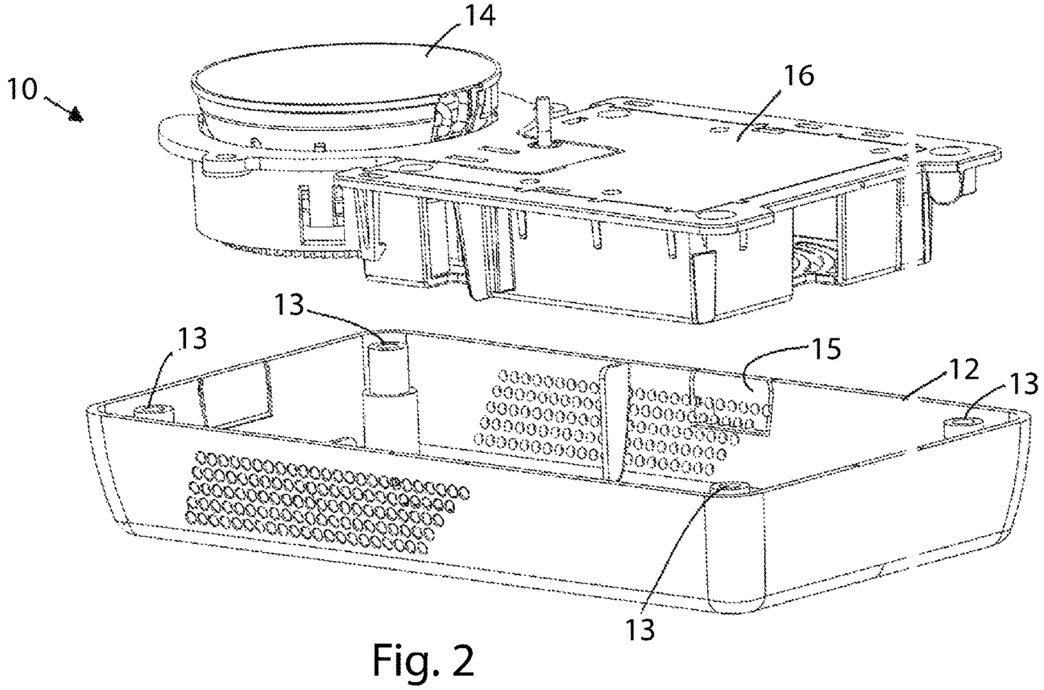
FIG. 2 is an exploded view of the mounting arrangement illustrated in FIG. 1.

The mounting arrangement 10 comprises a casing 12, housing therewithin functional components of the inductive outlet. As illustrated in FIG. 2, the casing comprises four through-going mounting apertures 13, and therewithin are disposed a coil housing 14, configured for containing therewithin the primary inductive coil, and an electronics housing 16, configured for containing therewithin other components of the inductive outlet.

Figure 3:
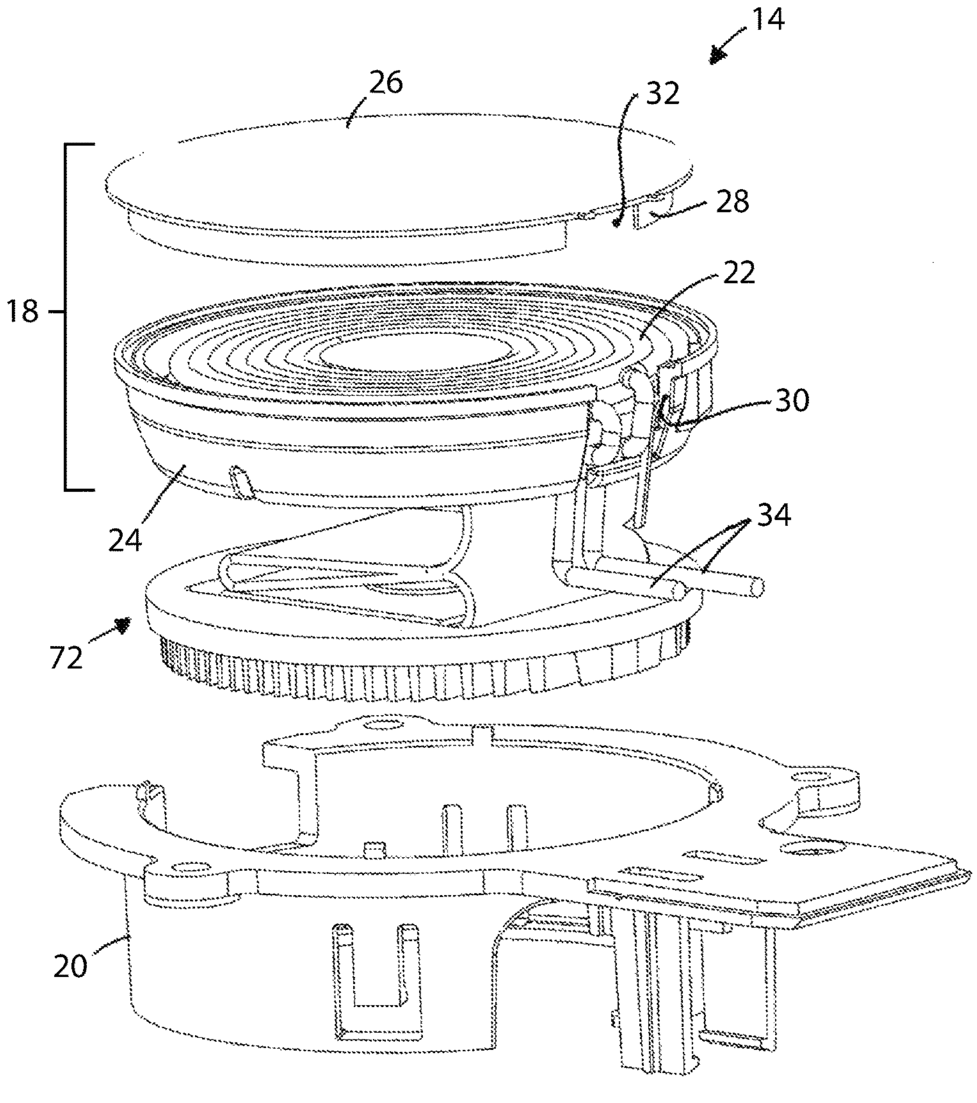
FIG. 3 is an exploded view of a coil housing of the mounting arrangement illustrated in FIG. 1.

As seen in FIG. 3, the coil housing 14 comprises an upper portion 18 (which may be disposed at least partially outside of the casing 12) and a lower portion 20. The upper portion 18 constitutes a closed chamber within which is disposed the primary inductive coil 22. The upper portion 18 comprises a coil basin 24 a cap 26, having a downwardly-protruding lip 28, configured to close it. The coil basin 24 and lip 28 of the cap 26 are formed with notches 30, 32, thereby accommodating passage therethrough of conductors 34 (such as wires, cables, or any other suitable element) connecting between the primary inductive coil 22 and controlling electronics and/or a power supply (not illustrated) of the inductive outlet.

Figure 4:
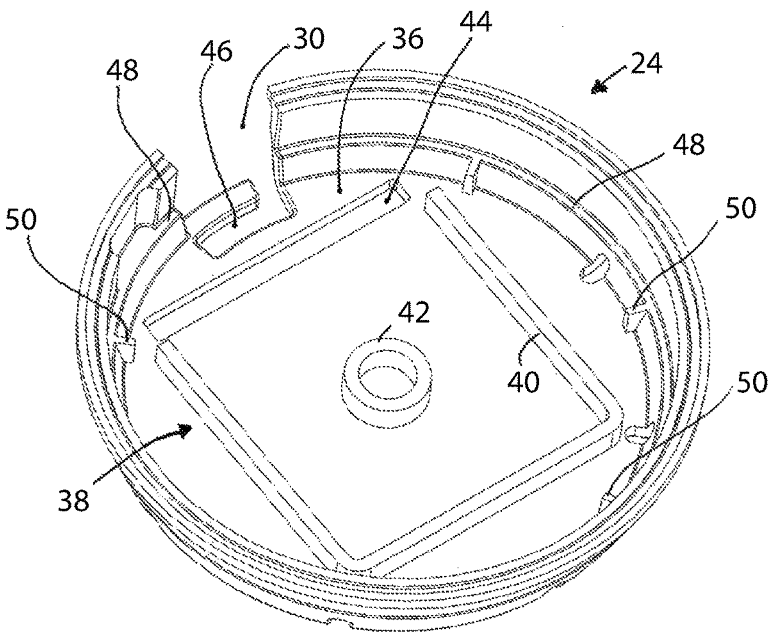
FIG. 4 is a top perspective view of a coil basin of a top portion of the coil housing illustrated in FIG. 3.

As illustrated in FIG. 4, a bottom surface 36 of the coil basin 24 is formed with a first heat sink support 38. The first heat sink support 38 comprises a retaining wall 40, open at one side, defining therewithin a space, for retaining part of a heat sink. A nipple 42 protrudes from the bottom surface 36 within the space, for example at or near the center thereof. A heat sink slot 44 passing through the bottom surface 36 is formed along the open side of the wall. A conductor slot 46 is formed connected to the notch 30, to facilitate passing the conductors 34 therethrough in cooperation therewith. A ledge 48 and protruding shelves 50 are formed around a perimeter slightly above the bottom surface 36, for example at the same or slightly greater height than that of the wall 40.

Figure 5A:
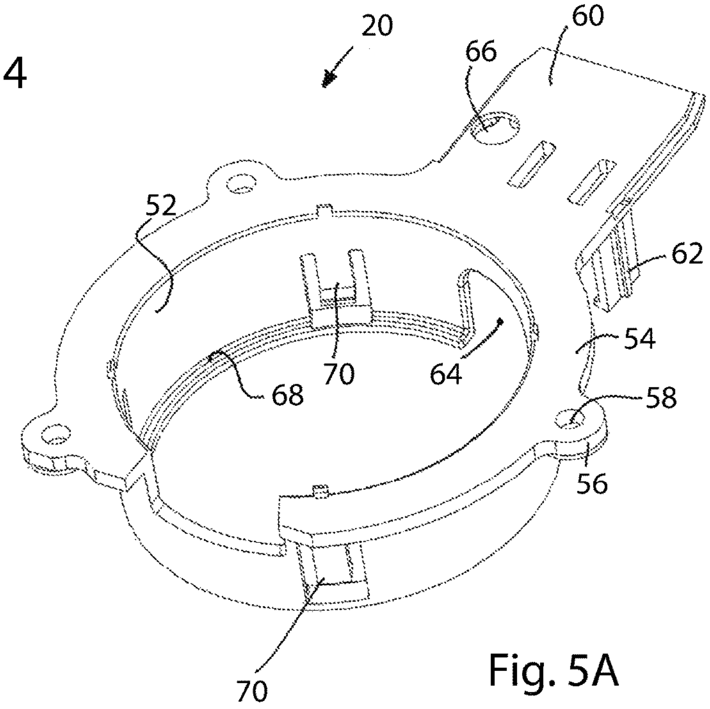
FIGS. 5A and 5B are top and bottom perspective views of a bottom portion of the coil housing illustrated in FIG. 3.
Figure 5B:
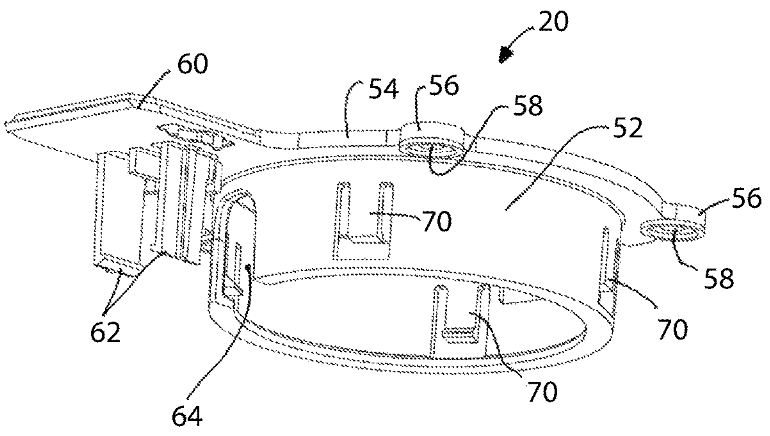

As illustrated in FIGS. 5A and 5B, the lower portion 20 comprises a circular wall 52 defining therewithin a well having an open bottom and a flange 54 around a top rim thereof. The flange 54 comprises three mounting protrusions 56, each being formed with an aperture 58 passing therethrough, to facilitate mounting of the coil housing 14, e.g., to the bottom face of the surface by screws or other suitable fastening members (not illustrated) passed therethrough. The flange 54 further comprises an assembly protrusion 60, configured for assembling the coil housing 14 with the electronics housing 16.

A pair of clips 62 a provided projecting downwardly from the assembly protrusion 60. The clips 62 are designed to retain therewithin a terminating plug of the conductors 34, which facilities their connection to the controlling electronics and/or power supply of the inductive outlet. An opening 64, for passage therethrough of the conductors 34, is formed in the wall 52 facing the clips 62. The assembly protrusion 60 is further formed with a through-going aperture 66, which may accommodate, e.g., a spring-loaded button (not illustrated), which may be used, for example, to detect when the mounting arrangement 10 has been removed.

The bottom edge of the circular wall 52 comprises an inwardly-directed lip 68, constituting a shelf. A number of flexible locking tabs 70 are formed in the wall 52 above the lip 68.

Figure 6A:
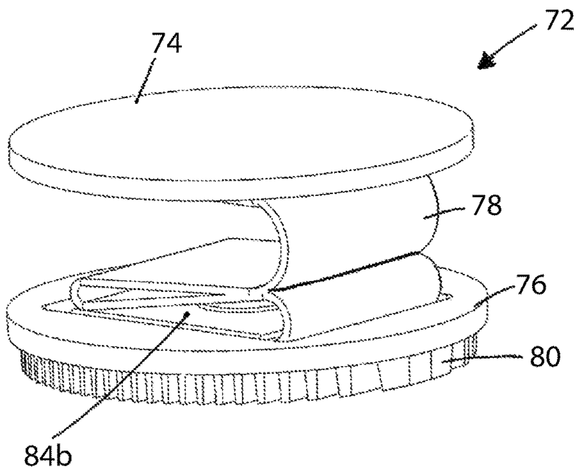
FIGS. 6A and 6B are top and bottom perspective views of a heat sink of the coil housing illustrated in FIG. 3.
Figure 6B:
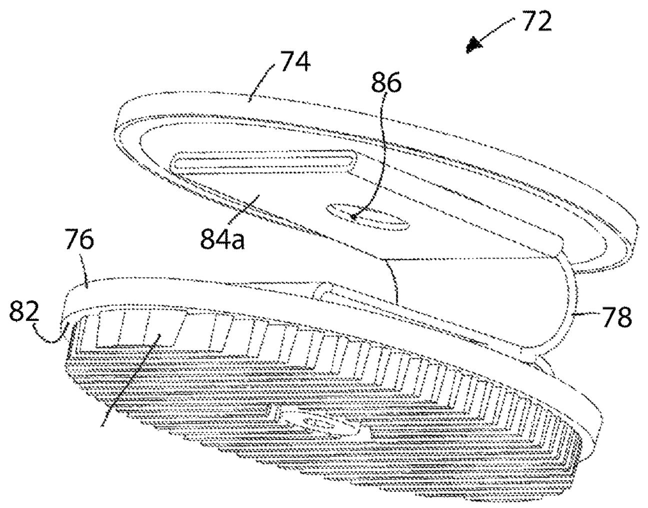

Reverting to FIG. 3, the coil housing 14 comprises a heat sink, which is generally indicated at 72, configured to expel thermal energy from the primary inductive coil 22. As better seen in FIGS. 6A and 6B, the heat sink 72 comprises a base 74 for drawing thermal energy from the primary inductive coil 22, and a heat rejector 76 thermally connected by a flexible thermal conductor 78. Each of the base 74 and heat rejector 76 may be constituted by a metal disk, with the heat rejector being formed with a plurality of fins 80 projecting downwardly therefrom, surrounded by a margin 82. The thermal conductor 78 terminates at a solid metal plate 84*a*, 84*b*. Each of the plates 84*a*, 84*b* is formed with a through-going aperture 86, to facilitate placement and/or attachment to its respective base 74/heat rejector 76.

When mounted on the base 74, the uppermost plate 82*a* is disposed such that it sits within the space defined by the retaining wall 40 formed on the bottom surface 36, with nipple 42 being received within its aperture 84. The flexible thermal conductor 78 passes through the heat sink slot 44 provided for that purpose. The base 74 rests on the ledge 48 and shelves 50 formed on the bottom surface 36 of the coil basin 24. When so disposed, the conductors 34 enter the upper portion 18 of the coil housing 14 via the conductor slot 46, pass around the base 74 via the notches 30, 32, and connect to the primary inductive coil 22 (best seen in FIG. 8).

When mounted in the lower portion 20 of the coil housing 14, the heat rejector 76 is disposed such that the margin 82 rests on the lip 68 formed thereon. The edge of the heat rejector 76 is secured within the locking tabs 70 formed in the wall 52. When so secured, the fins 80 project freely from the bottom of the lower portion 20. Apertures 88 (seen in FIG. 8) formed in the casing 12 below the heat sink 72 allow for air from outside the mounting arrangement 10 to circulate within the fins, thereby facilitating expelling of heat, generated by the primary inductive coil 22, therefrom.

Figure 7:
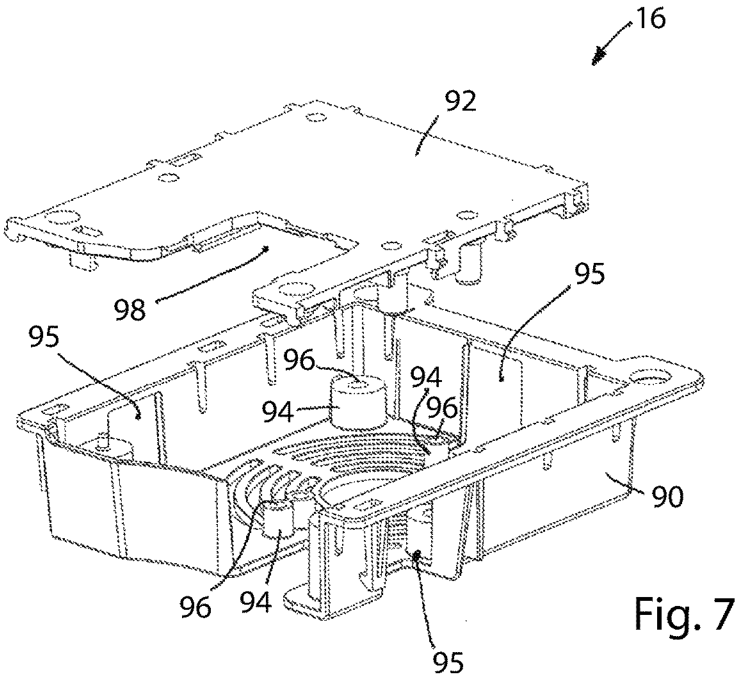
FIG. 7 is an exploded view of an electronics housing of the mounting arrangement illustrated in FIG. 1.

As illustrated in FIG. 7, the electronics housing 16 comprises a space which is suitable for containing therewithin the controlling electronics and/or power supply of the inductive outlet. It comprises an electronics box 90 and a cover 92.

The electronics box 90 is formed with openings 95 on three sides thereof, each of which is formed such that it is opposite a physical power outlet (not illustrated) of the controlling electronics (not illustrated; e.g., a circuit board) of the wireless power outlet. Such an arrangement of opening 95 facilitates connecting the wireless power outlet to a source of power and/or other wireless power outlets, irrespective of their respective positions to one another. The cover 12 comprises punchouts 15 (one of which is seen in FIG. 2), e.g., in the form of an area whose thickness is less than that of its surrounding, locate such that when the mounting arrangement 10 is assembled, the openings 95 are disposed substantially opposite the punchouts. Thus, a user can easily access the power outlets by breaking the suitable punchout 15.

The electronics box 90 further comprises a plurality of projections 94 having apertures 96, which are configured for mounting thereon one or more circuit boards (not illustrated). The projections 94 may be of different heights, facilitating installation of several circuit boards at different heights.

The cover 92 is configured for covering the electronics box 90, and comprises a cut-out 98, which is formed so as to cooperate with the assembly protrusion 60 of the lower portion 20 of the coil housing 14 in order to facilitate assembly of the electronics housing 16 with the coil housing.

Figure 8:
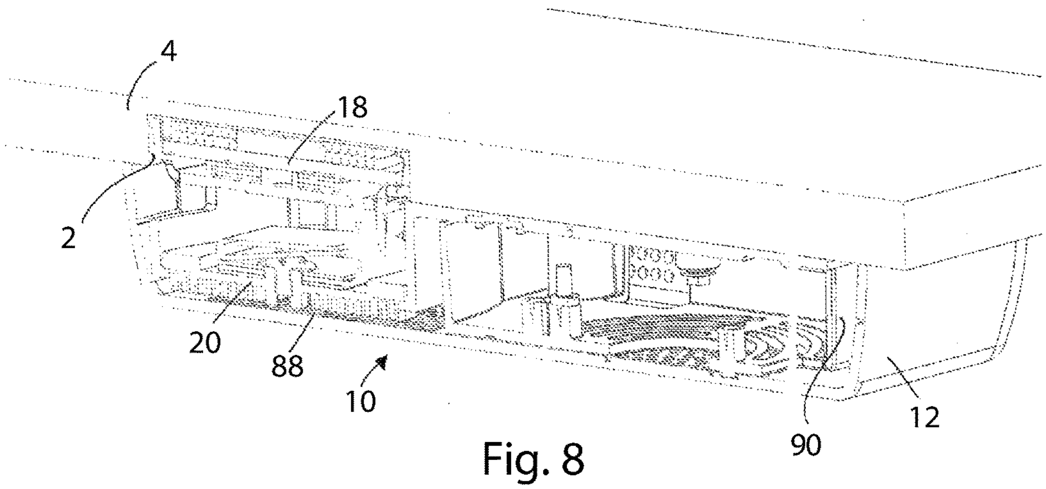
FIG. 8 is a cross-section view of the mounting arrangement taken along line I-I in FIG. 1, shown mounted on a surface.

As seen in FIG. 8, prior to installation, a blind aperture 2 is formed within the surface 4. The upper portion 18 of the coil housing is disposed within the aperture 2. The lower portion 20 is fastened to the underside of the surface 4 via the three mounting protrusions 56 (not seen in FIG. 8). Corners of the electronics box 90 overlap the mounting apertures 13 of the housing 12. Fastening arrangements (not illustrated), such as screws, are used to attach the housing 12 to the underside of the surface.

It will be appreciated that the example of the mounting arrangement 10 described above with reference to, and illustrated in, FIGS. 1 through 8 is suitable, e.g., when the thickness of the surface to which it is to be connected is relatively thin, i.e., the height of the aperture 2 is sufficient to approximately contain therewithin the thickness of the upper portion 18 of the coil housing 14. Thus, the upper portion 18 can maintain its position within the aperture 2 by resting on the lower portion 20 (which, as mentioned above, is fastened to the underside of the surface).

Figure 9:
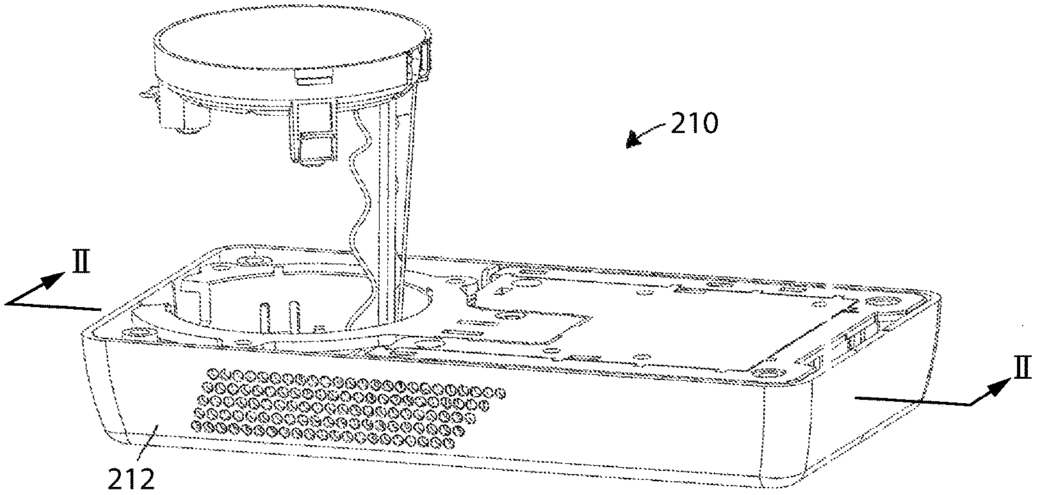
FIG. 9 is a perspective view of another example of a mounting arrangement according to the presently disclosed subject matter.
Figure 10:
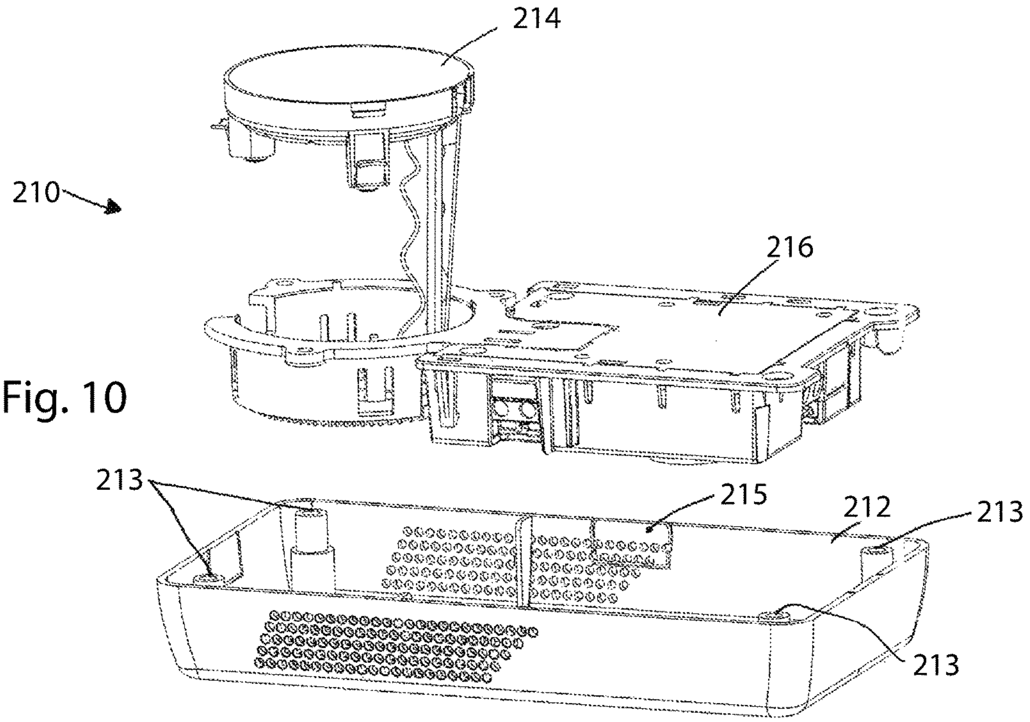
FIG. 10 is an exploded view of the mounting arrangement illustrated in FIG. 9.

As illustrated in FIG. 9, there is provided another example of a mounting arrangement, which is generally indicated at 210. The mounting arrangement 210 comprises a casing 212, housing therewithin functional components of the inductive outlet. As illustrated in FIG. 10, the casing comprises four through-going mounting apertures 213, and therewithin are disposed a coil housing 214, configured for containing therewithin the primary inductive coil, and an electronics housing 216, configured for containing therewithin other components of the inductive outlet.

Figure 11:
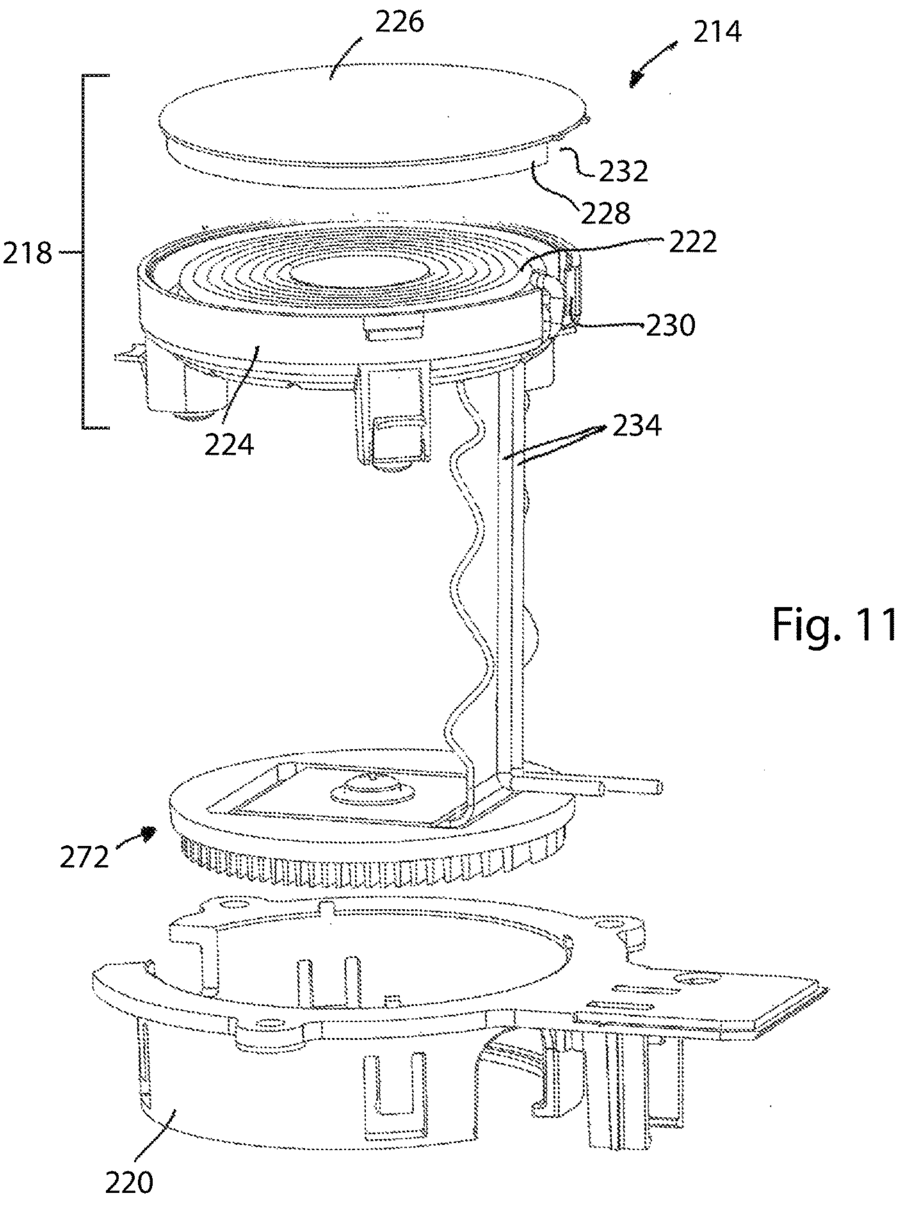
FIG. 11 is an exploded view of a coil housing of the mounting arrangement illustrated in FIG. 9.

As seen in FIG. 11, the coil housing 214 comprises an upper portion 218 (which is disposed outside of the casing 212) and a lower portion 220. The upper portion 218 constitutes a closed chamber within which is disposed the primary inductive coil 222. The upper portion 218 comprises a coil basin 224 a cap 226, having a downwardly-protruding lip 228, configured to close it. The coil basin 224 and lip 228 of the cap 226 are formed with notches 230, 232, thereby accommodating passage therethrough of conductors 234 (such as wires, cables, or any other suitable element) connecting between the primary inductive coil 222 and controlling electronics and/or a power supply (not illustrated) of the inductive outlet.

Figure 12:
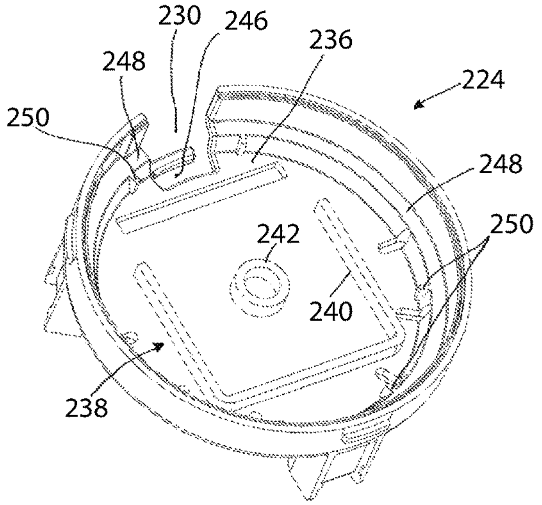
FIG. 12 is a top perspective view of a coil basin of a top portion of the coil housing illustrated in FIG. 11.

As illustrated in FIG. 12, a bottom surface 236 of the coil basin 224 is formed with a first heat sink support 238. The first heat sink support 238 comprises a retaining wall 240, open at one side, defining therewithin a space, for retaining part of a heat sink. A nipple 242 protrudes from the bottom surface 236 within the space, for example at or near the center thereof. A heat sink slot 244 passing through the bottom surface 236 is formed along the open side of the wall. A conductor slot 246 is formed connected to the notch 230, to facilitate passing the conductors 234 therethrough in cooperation therewith. A ledge 248 and protruding shelves 250 are formed around a perimeter slightly above the bottom surface 236, for example at the same or slightly greater height than that of the wall 240.

Figure 13A:
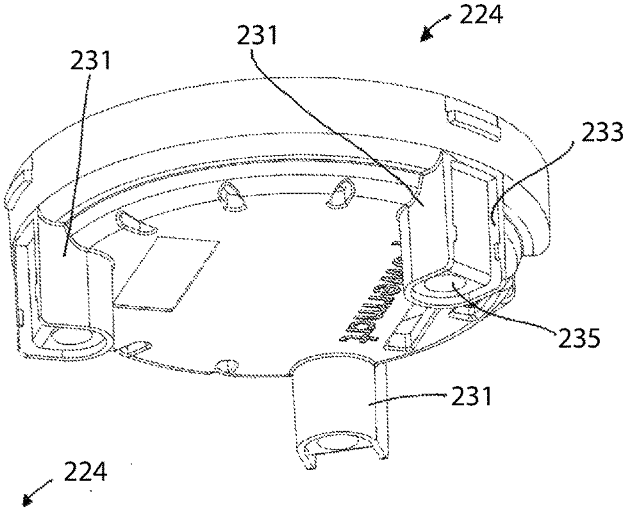
FIGS. 13A and 13B are bottom perspective views of the coil basin illustrated in FIG. 12, without and with, respectively, mounting claws attached thereto.
Figure 13B:
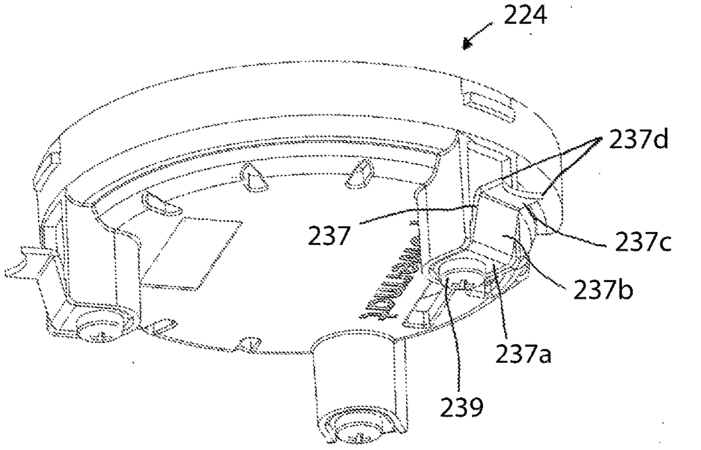

As illustrated in FIG. 13A, the coil basin 224 is formed with a plurality, e.g., three, retainer mounts 231 projecting downwardly therefrom. The retainer mounts 231 are formed with a recess 233 on the outer-facing and bottom sides, with a blind threaded aperture 235 on a bottom side thereof. As seen in FIG. 13B, each retainer mount 231 is provided with a mounting claw 237, which comprises a bottom side 237*a*, a riser 237*b*, and a grip 237*c* terminating in pointed ends 237*d*. The bottom side 237*a* and riser 237*b* are formed at an angle to one another which is greater than 90°. The bottom side 237*a* is formed with a through-going aperture (not illustrated). A screw 239, or other suitable fastening element, each mounting claw 237 in the recess 233 of its respective retainer mount 231.

Prior to installation, the screw 239 loosely holds the mounting claw 239 in place, allowing it to pivot freely. When the upper portion 218 of the coil housing 214 is put into place, each screw 239 is tightened, thereby securing the bottom side 237*a* against the bottom side of the retainer mount 231, and biasing the pointed ends 237*d* of the grip 237*c* outwardly. When this is performed on all of the retainer mounts 231, the mounting claws 237 collectively hold the coil basin 224 in place in an aperture which is sized so as to be engaged by all of the mounting claws 237.

Figure 14A:
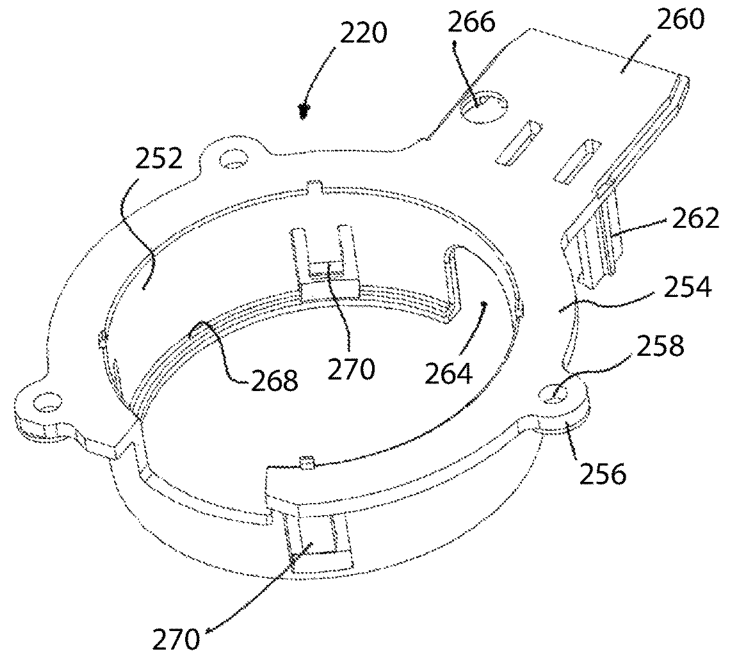
FIGS. 14A and 14B are top and bottom perspective views of a bottom portion of the coil housing illustrated in FIG. 11.
Figure 14B:
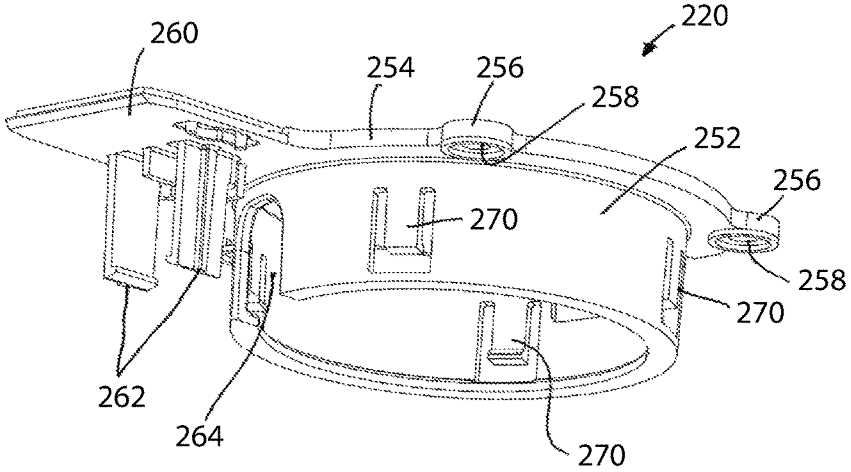

As illustrated in FIGS. 14A and 14B, the lower portion 220 comprises a circular wall 252 defining therewithin a well having an open bottom and a flange 254 around a top rim thereof. The flange 254 comprises three mounting protrusions 256, each being formed with an aperture 258 passing therethrough, to facilitate mounting of the coil housing 214, e.g., to the bottom face of the surface by screws or other suitable fastening members passed therethrough. The flange 254 further comprises an assembly protrusion 260, configured for assembling the coil housing 214 with the electronics housing 216.

A pair of clips 262 a provided projecting downwardly from the assembly protrusion 260. The clips 262 are designed to retain therewithin a terminating plug of the conductors 234, which facilities their connection to the controlling electronics and/or power supply of the inductive outlet. An opening 264, for passage therethrough of the conductors 234, is formed in the wall 252 facing the clips 262. The assembly protrusion 260 is further formed with a through-going aperture 266, which may accommodate, e.g., a spring-loaded button (not illustrated), which may be used, for example, to detect when the mounting arrangement 210 has been removed.

The bottom edge of the circular wall 252 comprises an inwardly-directed lip 268, constituting a shelf. A number of flexible locking tabs 270 are formed in the wall 252 above the lip 268.

Figure 15A:
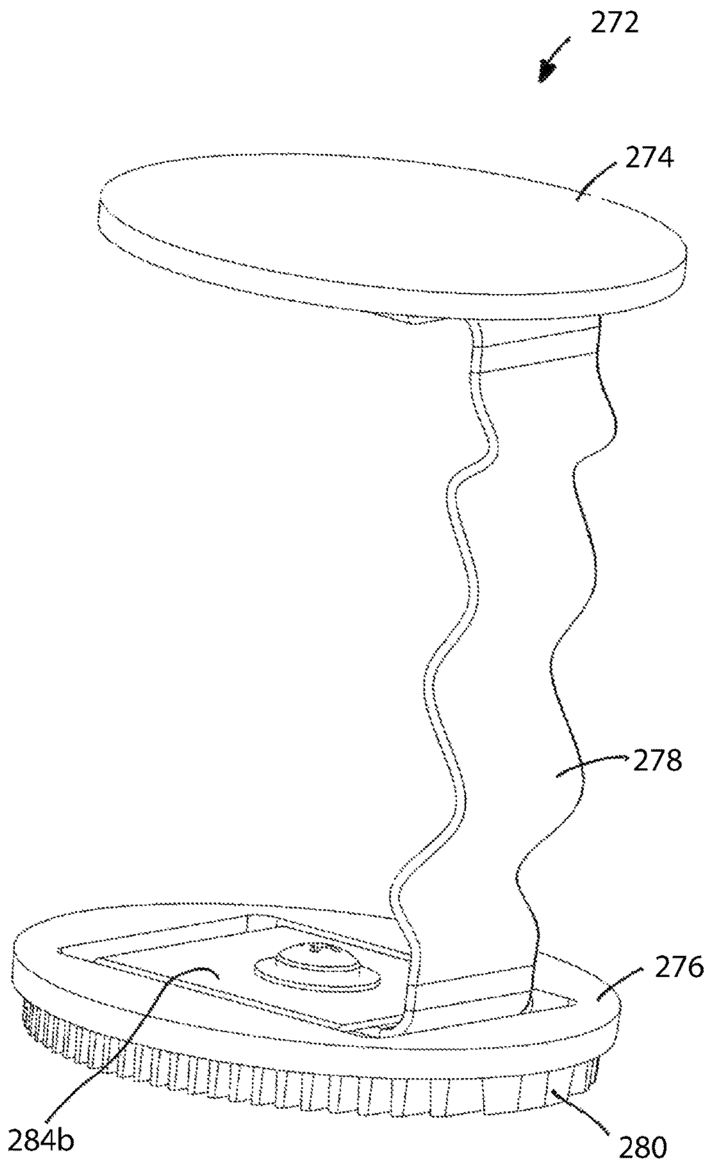
FIGS. 15A and 15B are top and bottom perspective views of a heat sink of the coil housing illustrated in FIG. 11.
Figure 15B:
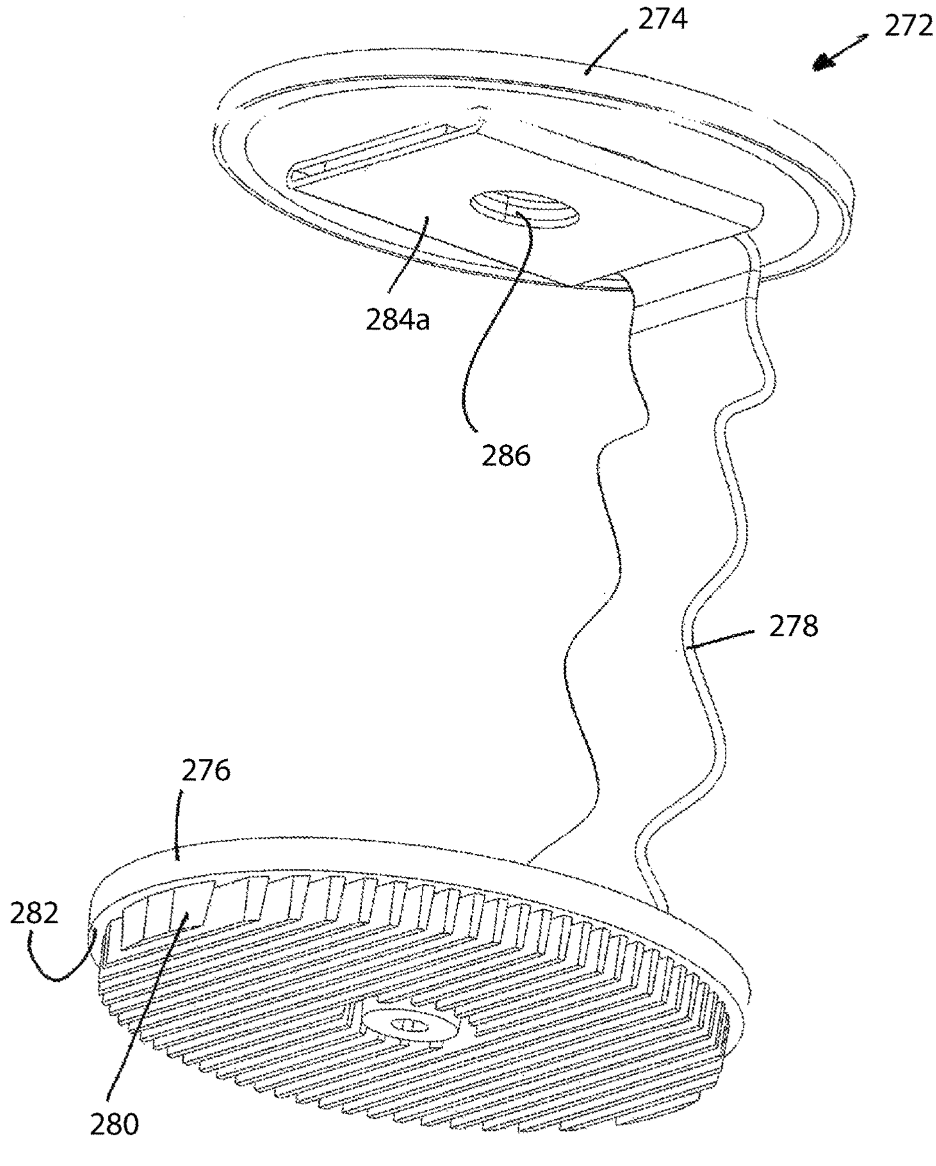

Reverting to FIG. 11, the coil housing 214 comprises a heat sink, which is generally indicated at 272, configured to expel thermal energy from the primary inductive coil 222. As better seen in FIGS. 15A and 15B, the heat sink 272 comprises a base 274 for drawing thermal energy from the primary inductive coil 222, and a heat rejector 276 thermally connected by a flexible thermal conductor 278. Each of the base 274 and heat rejector 276 may be constituted by a metal disk, with the heat rejector being formed with a plurality of fins 280 projecting downwardly therefrom, surrounded by a margin 282. The thermal conductor 278 terminates at a solid metal plate 284*a*, 284*b*. Each of the plates 284*a*, 284*b* is formed with a through-going aperture 286, to facilitate placement and/or attachment to its respective base 274/heat rejector 276.

When mounted on the base 274, the uppermost plate 282*a* is disposed such that it sits within the space defined by the retaining wall 240 formed on the bottom surface 236, with nipple 242 being received within its aperture 284. The flexible thermal conductor 278 passes through the heat sink slot 244 provided for that purpose. The base 274 rests on the ledge 248 and shelves 250 formed on the bottom surface 236 of the coil basin 224. When so disposed, the conductors 234 enter the upper portion 218 of the coil housing 214 via the conductor slot 246, pass around the base 274 via the notches 230, 232, and connect to the primary inductive coil 222 (best seen in FIG. 17).

When mounted in the lower portion 220 of the coil housing 214, the heat rejector 276 is disposed such that the margin 282 rests on the lip 268 formed thereon. The edge of the heat rejector 276 is secured within the locking tabs 270 formed in the wall 252. When so secured, the fins 280 project freely from the bottom of the lower portion 220. Apertures 288 (seen in FIG. 17) formed in the casing 212 below the heat sink 272 allow for air from outside the mounting arrangement 210 to circulate within the fins, thereby facilitating expelling of heat, generated by the primary inductive coil 222, therefrom.

Figure 16:
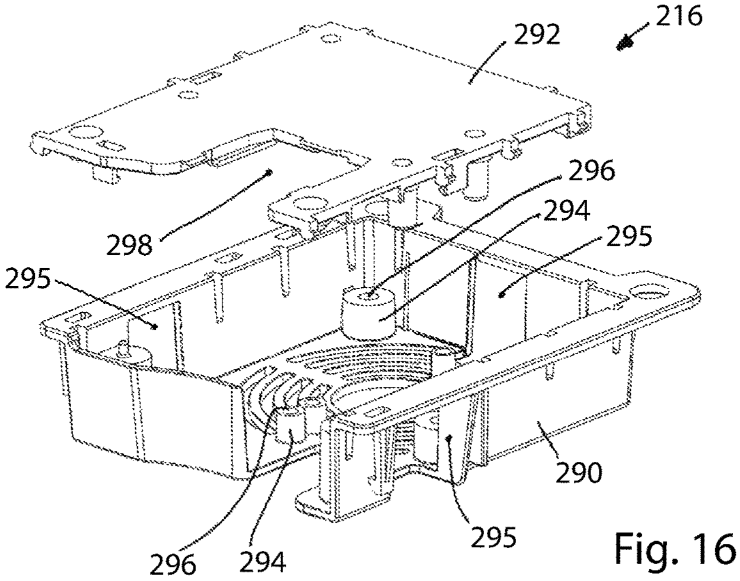
FIG. 16 is an exploded view of an electronics housing of the mounting arrangement illustrated in FIG. 9.

As illustrated in FIG. 16, the electronics housing 216 comprises a space which is suitable for containing therewithin the controlling electronics and/or power supply of the inductive outlet. It comprises an electronics box 290 and a cover 292.

The electronics box 290 is formed with openings 295 on three sides thereof, each of which is formed such that it is opposite a physical power outlet (not illustrated) of the controlling electronics (not illustrated; e.g., a circuit board) of a wireless power outlet, such as an inductive power outlet or the like. Such an arrangement of opening 295 facilitates connecting the inductive or other wireless power outlet to a source of power and/or other wireless power outlets, irrespective of their respective positions to one another. The cover 212 comprises punchouts 215 (one of which is seen in FIG. 10), e.g., in the form of an area whose thickness is less than that of its surrounding, locate such that when the mounting arrangement 210 is assembled, the openings 295 are disposed substantially opposite the punchouts. Thus, a user can easily access the power outlets by breaking the suitable punchout 215.

The electronics box 290 further comprises a plurality of projections 294 having apertures 296, which are configured for mounting thereon one or more circuit boards (not illustrated). The projections 294 may be of different heights, facilitating installation of several circuit boards at different heights.

The cover 292 is configured for covering the electronics box 290, and comprises a cut-out 298, which is formed so as to cooperate with the assembly protrusion 260 of the lower portion 220 of the coil housing 214 in order to facilitate assembly of the electronics housing 216 with the coil housing.

Figure 17:
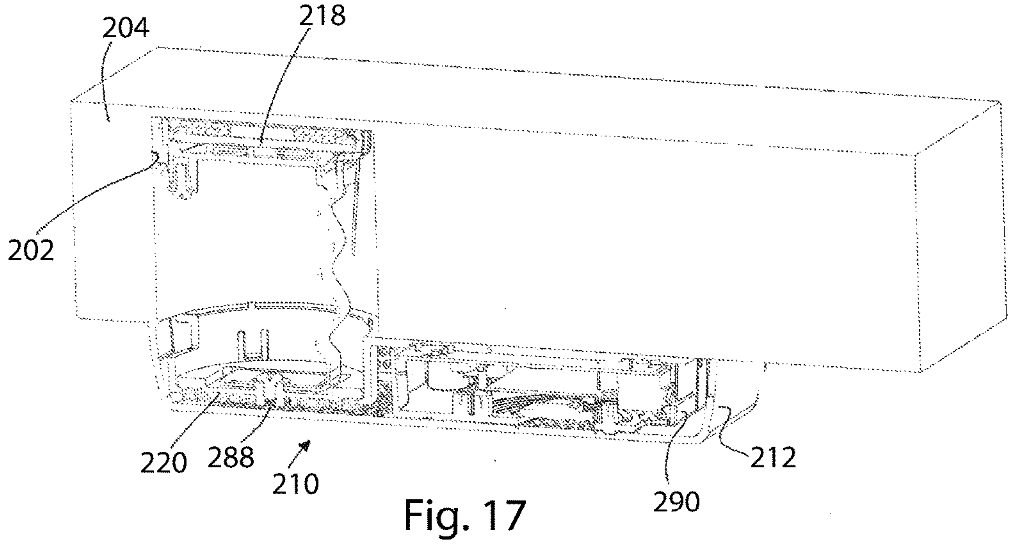
FIG. 17 is a cross-section view of the mounting arrangement taken along line II-II in FIG. 9, shown mounted on a surface.

As seen in FIG. 17, prior to installation, a blind aperture 202 is formed within the surface 204. The upper portion 218 of the coil housing is disposed within the aperture 202, and secured therein, using the mounting claws 237 as described above with reference to FIGS. 13A and 13B. The lower portion 220 is fastened to the underside of the surface 4 via the three mounting protrusions 256 (not seen in FIG. 17). Corners of the electronics box 290 overlap the mounting apertures 213 of the housing 212. Fastening arrangements (not illustrated) such as screws, are used to attach the housing 212 to the underside of the surface.

It will be appreciated that the example of the mounting arrangement 210 described above with reference to, and illustrated in, FIGS. 9 through 17, is suitable, e.g., when the thickness of the surface to which it is to be connected is relatively thick, i.e., the height of the aperture 202 is such that the upper portion 218 of the coil housing 214 is spaced apart from the lower portion 220 thereof.

Figure 18:
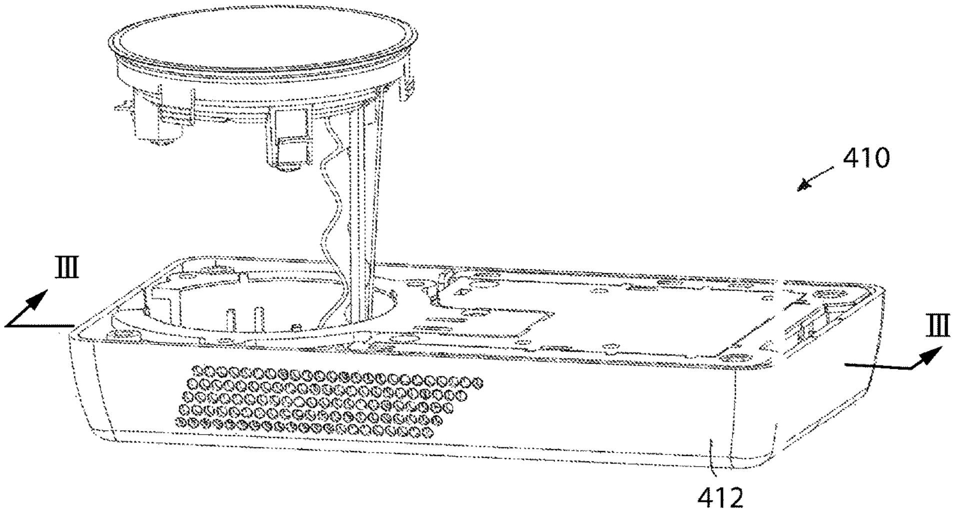
FIG. 18 is a perspective view of a further example of a mounting arrangement according to the presently disclosed subject matter.
Figure 19:
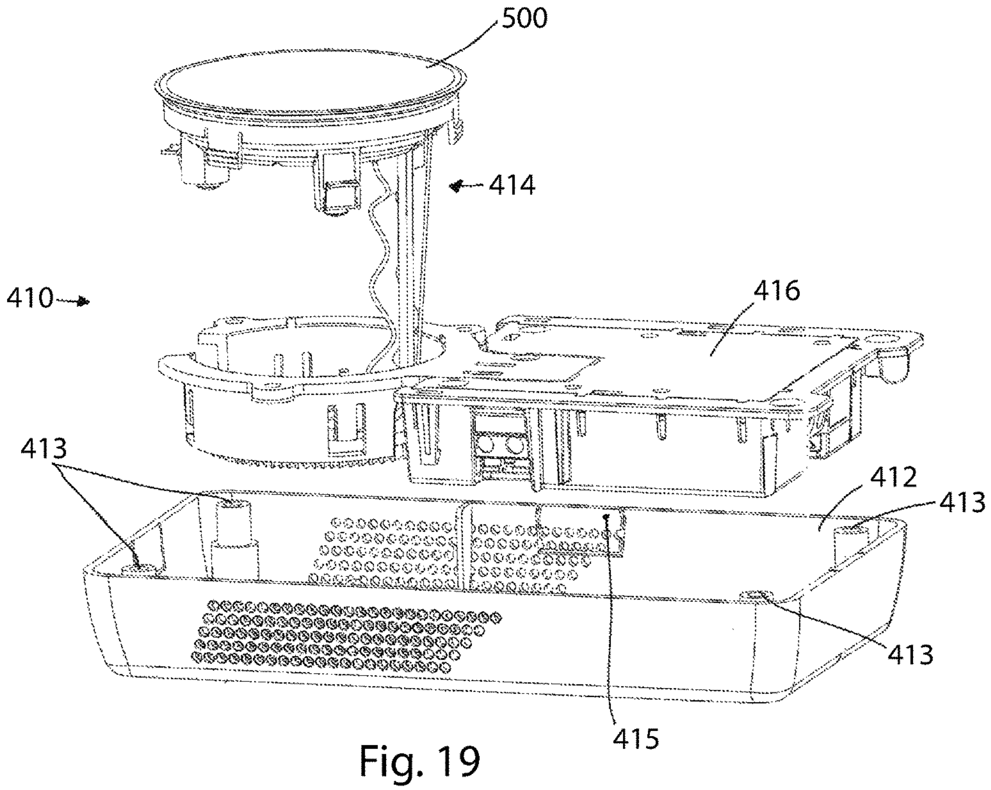
FIG. 19 is an exploded view of the mounting arrangement illustrated in FIG. 18.

As illustrated in FIG. 18, there is provided a further example of a mounting arrangement, which is generally indicated at 410. The mounting arrangement 410 may be used for surface mounting of the primary inductive coil, and comprises a casing 412, housing therewithin functional components of the inductive outlet. As illustrated in FIG. 19, the casing comprises four through-going mounting apertures 413, and therewithin are disposed a coil housing 414, configured for containing therewithin the primary inductive coil, and an electronics housing 416, configured for containing therewithin other components of the inductive outlet.

Figure 20:
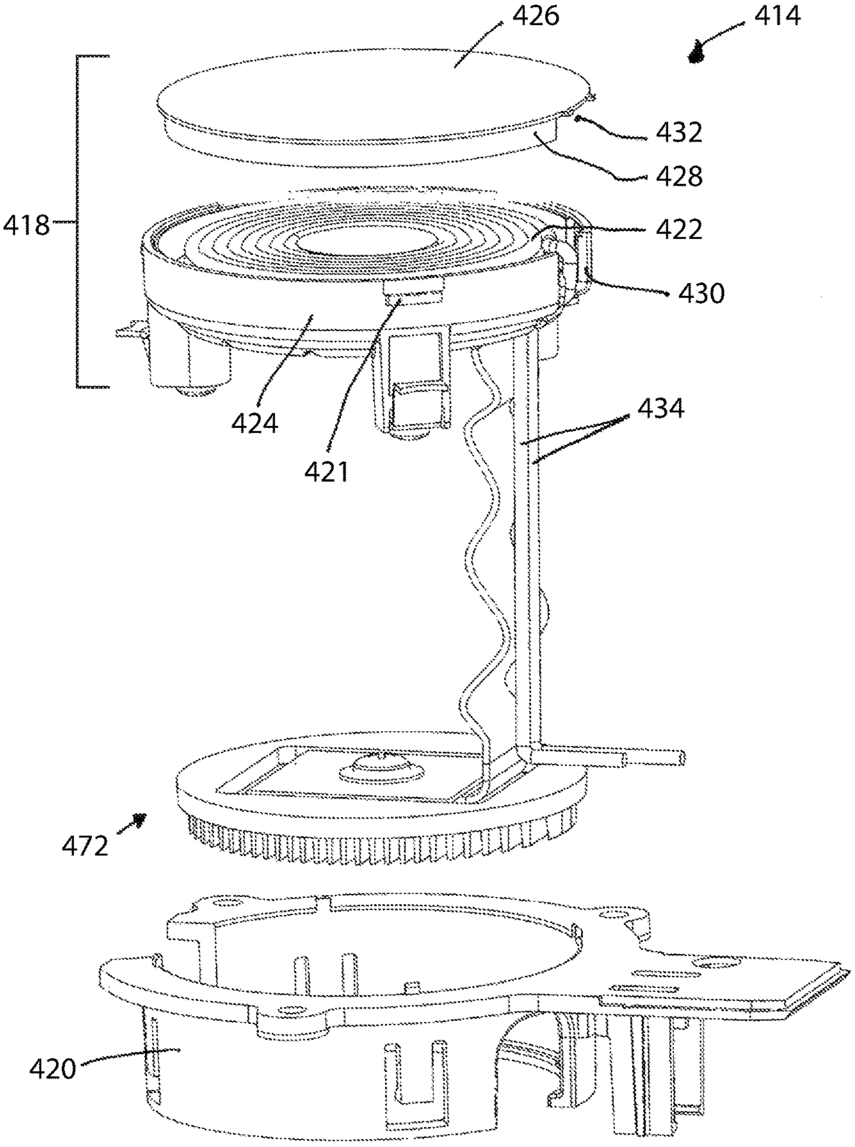
FIG. 20 is an exploded view of a coil housing of the mounting arrangement illustrated in FIG. 18.

As seen in FIG. 20, the coil housing 414 comprises an upper portion 418 (which is disposed outside of the casing 412) and a lower portion 420. The upper portion 418 constitutes a closed chamber within which is disposed the primary inductive coil 422. The upper portion 418 comprises a coil basin 424 a cap 426, having a downwardly-protruding lip 428, configured to close it. The coil basin 424 and lip 428 of the cap 426 are formed with notches 430, 432, thereby accommodating passage therethrough of conductors 434 (such as wires, cables, or any other suitable element) connecting between the primary inductive coil 422 and controlling electronics and/or a power supply (not illustrated) of the inductive outlet. The outer side surface of the coil basin 424 is formed with a plurality (e.g., three, as illustrated) of tabs 421 projecting therefrom.

Figure 21:
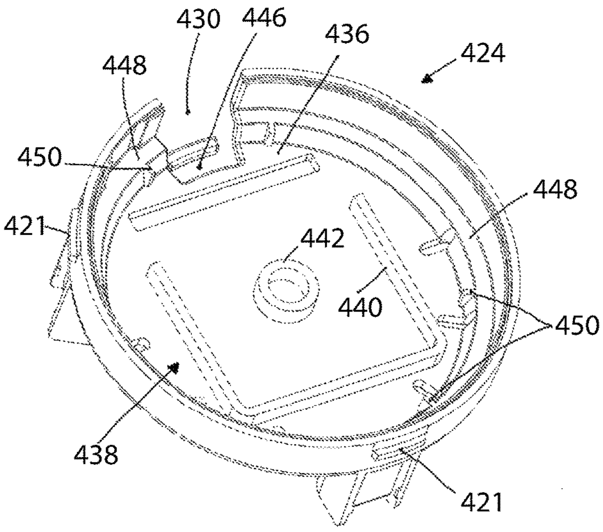
FIG. 21 is a top perspective view of a coil basin of a top portion of the coil housing illustrated in FIG. 20.

As illustrated in FIG. 21, a bottom surface 436 of the coil basin 424 is formed with a first heat sink support 438. The first heat sink support 438 comprises a retaining wall 440, open at one side, defining therewithin a space, for retaining part of a heat sink. A nipple 442 protrudes from the bottom surface 436 within the space, for example at or near the center thereof. A heat sink slot 444 passing through the bottom surface 436 is formed along the open side of the wall. A conductor slot 446 is formed connected to the notch 430, to facilitate passing the conductors 434 therethrough in cooperation therewith. A ledge 448 and protruding shelves 450 are formed around a perimeter slightly above the bottom surface 436, for example at the same or slightly greater height than that of the wall 440.

Figure 22A:
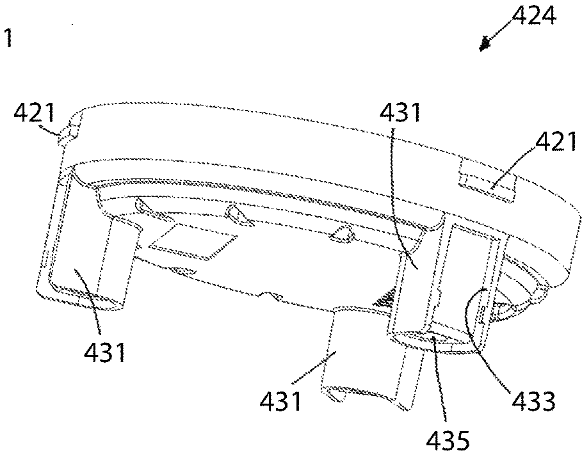
FIGS. 22A and 22B are bottom perspective views of the coil basin illustrated in FIG. 21, without and with, respectively, mounting claws attached thereto.
Figure 22B:
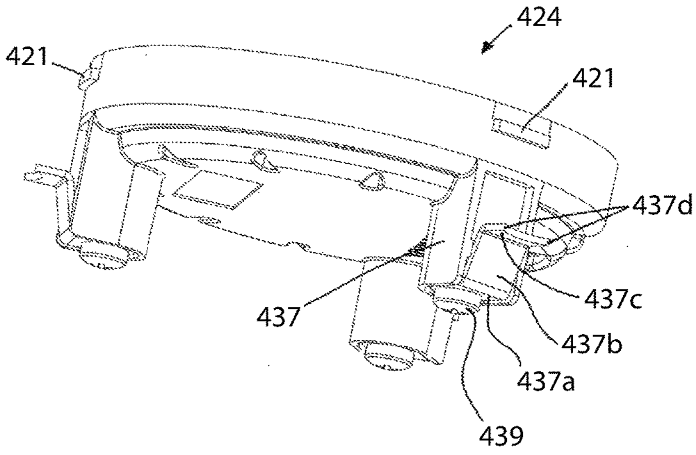

As illustrated in FIG. 22A, the coil basin 424 is formed with a plurality, e.g., three, retainer mounts 431 projecting downwardly therefrom. The retainer mounts 431 are formed with a recess 433 on the outer-facing and bottom sides, with a blind threaded aperture 435 on a bottom side thereof. As seen in FIG. 22B, each retainer mount 431 is provided with a mounting claw 437, which comprises a bottom side 437*a*, a riser 437*b*, and a grip 437*c* terminating in pointed ends 437*d*. The bottom side 437*a* and riser 437*b* are formed at an angle to one another which is greater than 90°. The bottom side 437*a* is formed with a through-going aperture (not illustrated). A screw 439, or other suitable fastening element, each mounting claw 437 in the recess 433 of its respective retainer mount 431.

Prior to installation, the screw 439 loosely holds the mounting claw 439 in place, allowing it to pivot freely. When the upper portion 418 of the coil housing 414 is put into place, each screw 439 is tightened, thereby securing the bottom side 437*a* against the bottom side of the retainer mount 431, and biasing the pointed ends 437*d* of the grip 437*c* outwardly. When this is performed on all of the retainer mounts 431, the mounting claws 437 collectively hold the coil basin 424 in place in an aperture which is sized so as to be engaged by all of the mounting claws 437.

Figure 23A:
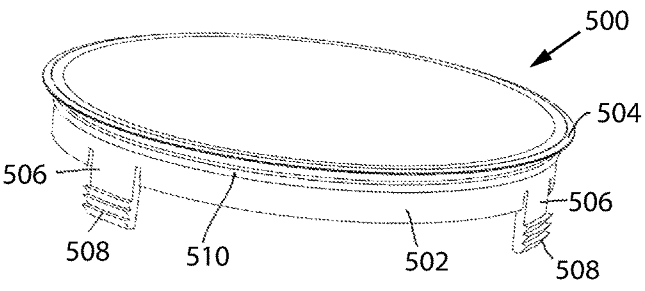
FIGS. 23A and 23B are top and bottom perspective views, respectively, of a lid of the mounting arrangement illustrated in FIG. 18.
Figure 23B:
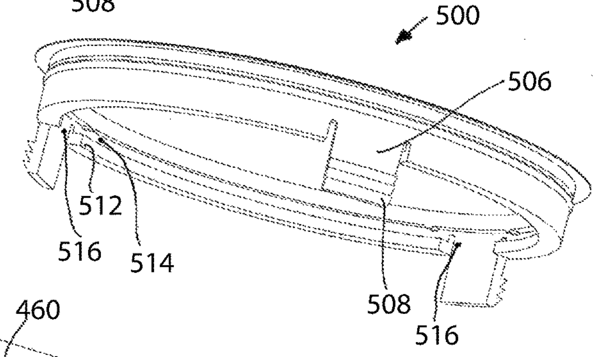

Reverting to FIG. 19, a lid 500 is provided, cooperating with the coil basin 424, e.g., to cover a through-going aperture in the surface. As illustrated in FIGS. 23A and 23B, the lid 500 comprises a circular sidewall 502 with a radial flange 504 projecting therefrom. The flange 504 may be formed integrally with the sidewall 502, or be a separate piece therefrom. A plurality of retention tabs 506 project downwardly from the sidewall 502. Each of the retention tabs 506 comprises several friction elements 508 projecting outwardly therefrom. In addition, a gasket 510 is provided on the side wall 502, for example within a suitable groove (not illustrated) provided for that purpose.

The inner surface of the sidewall 502 is formed with an inwardly-facing lip 512, defining a channel 514 having the same height at the tabs 421 which project from the outer side surface of the coil basin 424, as described above. Gaps 516 are formed in the lip 512, for example behind the retention tabs 506. The number, sizes, and relative positions of the gaps 516 correspond with those of the tabs 421. Thus, the lid 500 may be mounted on the coil basin 424 by being placed over it such that the tabs 421 pass through the gaps 516 until the tabs 421 are aligned with the channel 514. The lid 500 (or coil basin 424) is rotated such that the tabs 421 slide within the channel 514, thereby locking the lid and coil basin 424 together.

Figure 24A:
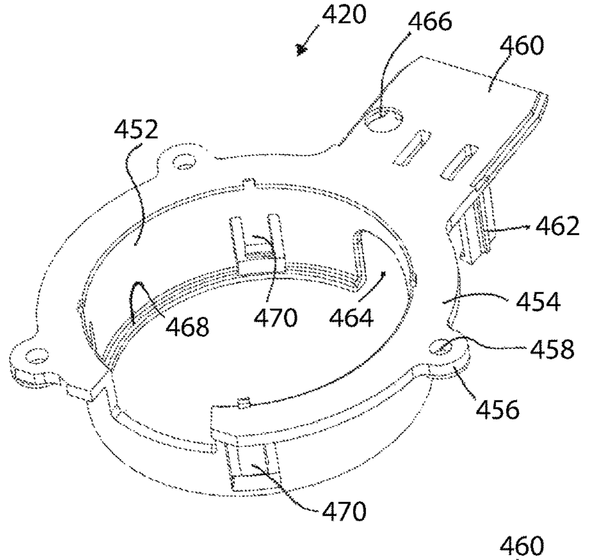
FIGS. 24A and 24B are top and bottom perspective views of a bottom portion of the coil housing illustrated in FIG. 20.
Figure 24B:
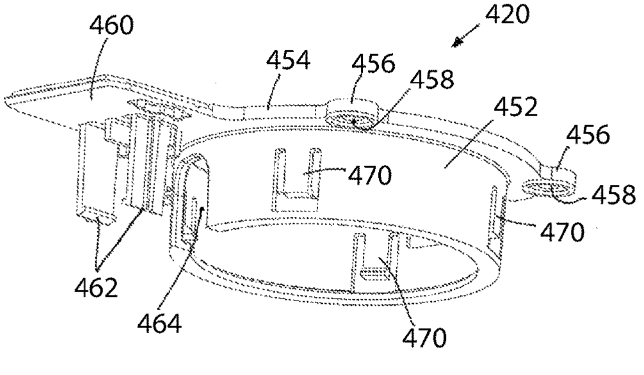

As illustrated in FIGS. 24A and 24B, the lower portion 420 comprises a circular wall 452 defining therewithin a well having an open bottom and a flange 454 around a top rim thereof. The flange 454 comprises three mounting protrusions 456, each being formed with an aperture 458 passing therethrough, to facilitate mounting of the coil housing 414, e.g., to the bottom face of the surface by screws or other suitable fastening members passed therethrough. The flange 454 further comprises an assembly protrusion 460, configured for assembling the coil housing 414 with the electronics housing 416.

A pair of clips 462 a provided projecting downwardly from the assembly protrusion 460. The clips 462 are designed to retain therewithin a terminating plug of the conductors 434, which facilities their connection to the controlling electronics and/or power supply of the inductive outlet. An opening 464, for passage therethrough of the conductors 434, is formed in the wall 452 facing the clips 462. The assembly protrusion 460 is further formed with a through-going aperture 466, which may accommodate, e.g., a spring-loaded button (not illustrated), which may be used, for example, to detect when the mounting arrangement 410 has been removed.

The bottom edge of the circular wall 452 comprises an inwardly-directed lip 468, constituting a shelf. A number of flexible locking tabs 470 are formed in the wall 452 above the lip 468.

Figure 25A:
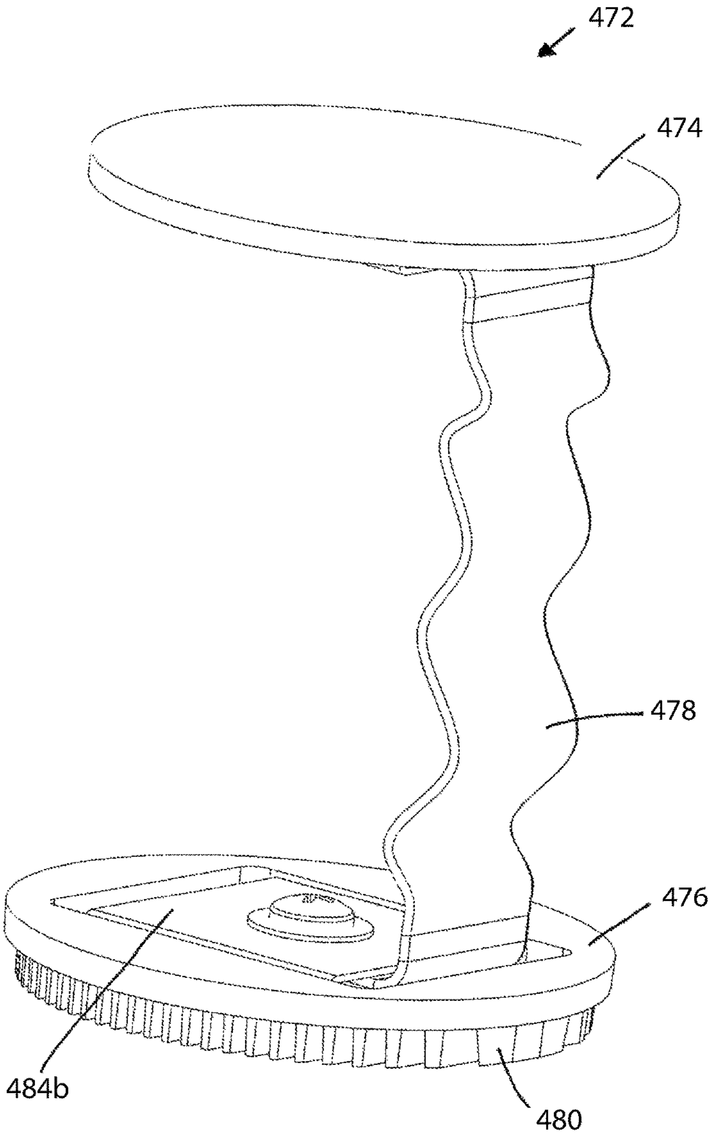
FIGS. 25A and 25B are top and bottom perspective views of a heat sink of the coil housing illustrated in FIG. 20.
Figure 25B:
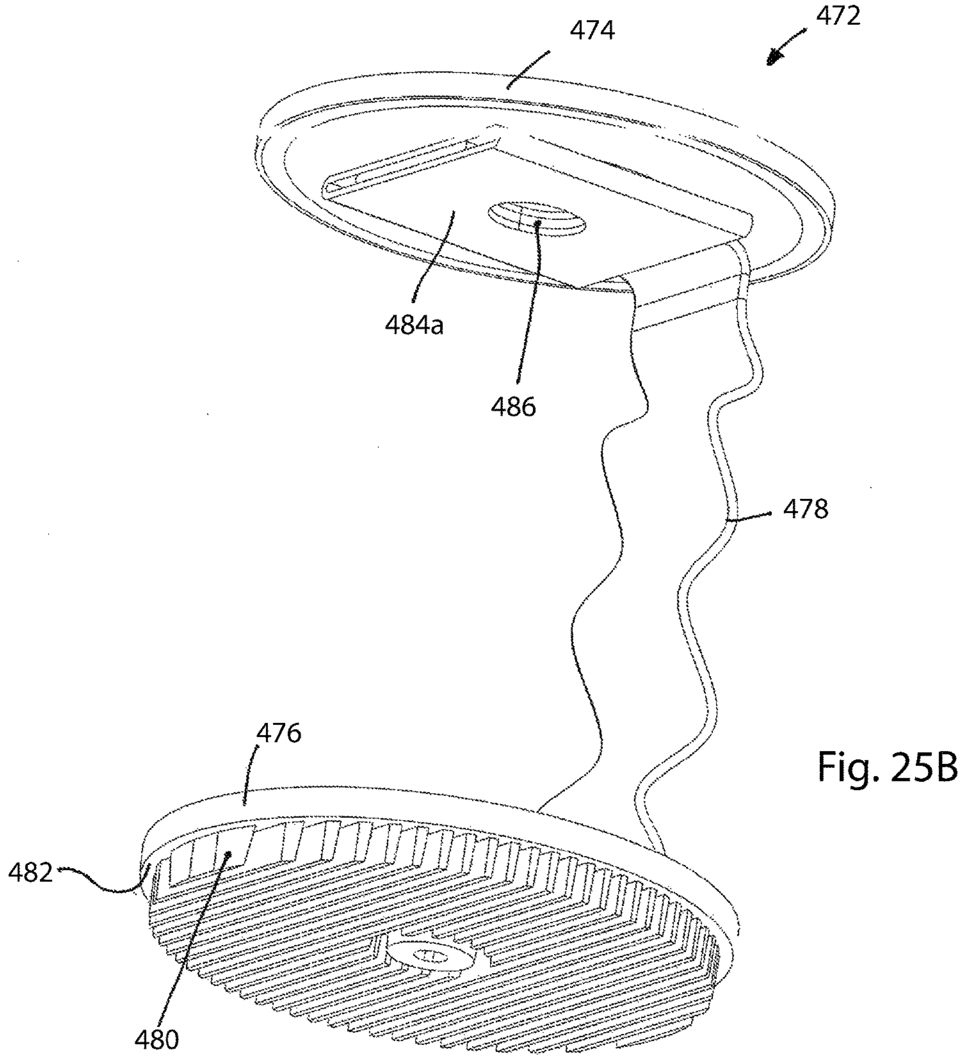

Reverting to FIG. 20, the coil housing 414 comprises a heat sink, which is generally indicated at 472, configured to expel thermal energy from the primary inductive coil 422. As better seen in FIGS. 25A and 25B, the heat sink 472 comprises a base 474 for drawing thermal energy from the primary inductive coil 422, and a heat rejector 476 thermally connected by a flexible thermal conductor 478. Each of the base 474 and heat rejector 476 may be constituted by a metal disk, with the heat rejector being formed with a plurality of fins 480 projecting downwardly therefrom, surrounded by a margin 482. The thermal conductor 478 terminates at a solid metal plate 484*a*, 484*b*. Each of the plates 484*a*, 484*b* is formed with a through-going aperture 486, to facilitate placement and/or attachment to its respective base 474/heat rejector 476.

When mounted on the base 474, the uppermost plate 482*a* is disposed such that it sits within the space defined by the retaining wall 440 formed on the bottom surface 436, with nipple 442 being received within its aperture 484. The flexible thermal conductor 478 passes through the heat sink slot 444 provided for that purpose. The base 474 rests on the ledge 448 and shelves 450 formed on the bottom surface 436 of the coil basin 424. When so disposed, the conductors 434 enter the upper portion 418 of the coil housing 414 via the conductor slot 446, pass around the base 474 via the notches 430, 432, and connect to the primary inductive coil 422 (best seen in FIG. 27).

When mounted in the lower portion 420 of the coil housing 414, the heat rejector 476 is disposed such that the margin 482 rests on the lip 468 formed thereon. The edge of the heat rejector 476 is secured within the locking tabs 470 formed in the wall 452. When so secured, the fins 480 project freely from the bottom of the lower portion 420. Apertures 488 (seen in FIG. 27) formed in the casing 412 below the heat sink 472 allow for air from outside the mounting arrangement 410 to circulate within the fins, thereby facilitating expelling of heat, generated by the primary inductive coil 422, therefrom.

Figure 26:
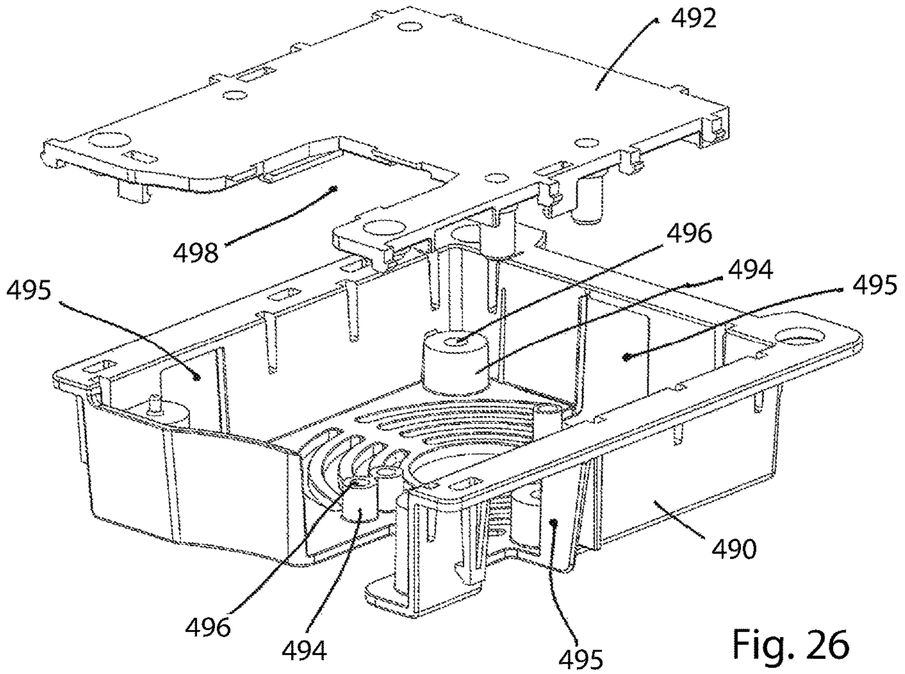
FIG. 26 is an exploded view of an electronics housing of the mounting arrangement illustrated in FIG. 18.

As illustrated in FIG. 26, the electronics housing 416 comprises a space which is suitable for containing therewithin the controlling electronics and/or power supply of the inductive outlet. It comprises an electronics box 490 and a cover 492.

The electronics box 490 is formed with openings 495 on three sides thereof, each of which is formed such that it is opposite a physical power outlet (not illustrated) of the controlling electronics (not illustrated; e.g., a circuit board) of the wireless power outlet. Such an arrangement of opening 495 facilitates connecting the wireless power outlet to a source of power and/or other wireless power outlets, irrespective of their respective positions to one another. The cover 412 comprises punchouts 415 (one of which is seen in FIG. 19), e.g., in the form of an area whose thickness is less than that of its surrounding, locate such that when the mounting arrangement 410 is assembled, the openings 495 are disposed substantially opposite the punchouts. Thus, a user can easily access the power outlets by breaking the suitable punchout 415.

The electronics box 490 further comprises a plurality of projections 494 having apertures 496, which are configured for mounting thereon one or more circuit boards (not illustrated). The projections 494 may be of different heights, facilitating installation of several circuit boards at different heights.

The cover 492 is configured for covering the electronics box 490, and comprises a cut-out 498, which is formed so as to cooperate with the assembly protrusion 460 of the lower portion 420 of the coil housing 414 in order to facilitate assembly of the electronics housing 416 with the coil housing.

Figure 27:
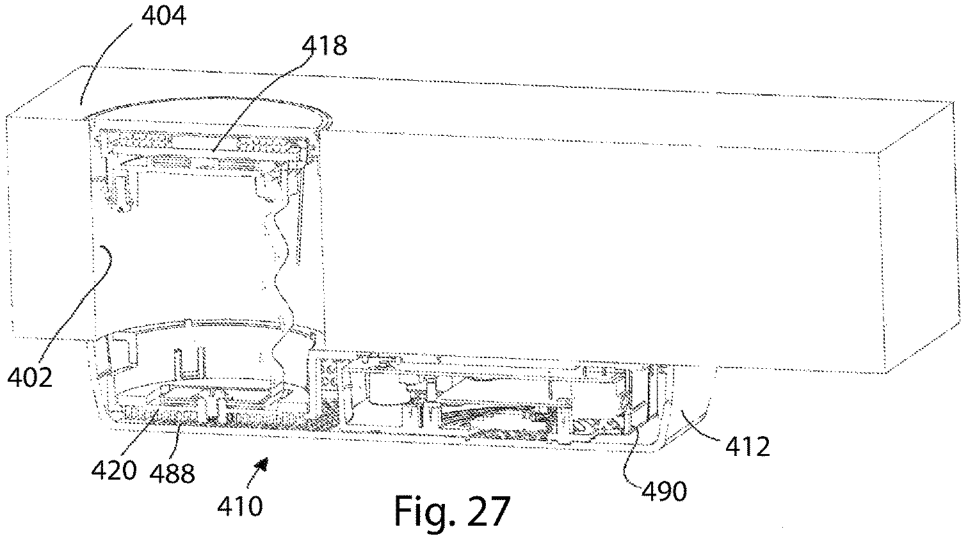
FIG. 27 is a cross-section view of the mounting arrangement taken along line in FIG. 18, shown mounted on a surface.

As seen in FIG. 27, prior to installation, a blind aperture 402 is formed within the surface 404. The upper portion 418 of the coil housing is disposed within the aperture 402, and secured therein, using the mounting claws 437 as described above with reference to FIGS. 22A and 22B. The lower portion 420 is fastened to the underside of the surface 4 via the three mounting protrusions 456 (not seen in FIG. 17). Corners of the electronics box 490 overlap the mounting apertures 413 of the housing 412. Fastening arrangements (not illustrated) such as screws, are used to attach the housing 412 to the underside of the surface.

It will be appreciated that the example of the mounting arrangement 410 described above with reference to, and illustrated in, FIGS. 18 through 27, is suitable, e.g., when the thickness of the surface to which it is to be connected is relatively thick, i.e., the height of the aperture 402 is such that the upper portion 418 of the coil housing 414 is spaced apart from the lower portion 420 thereof.

Figure 28:
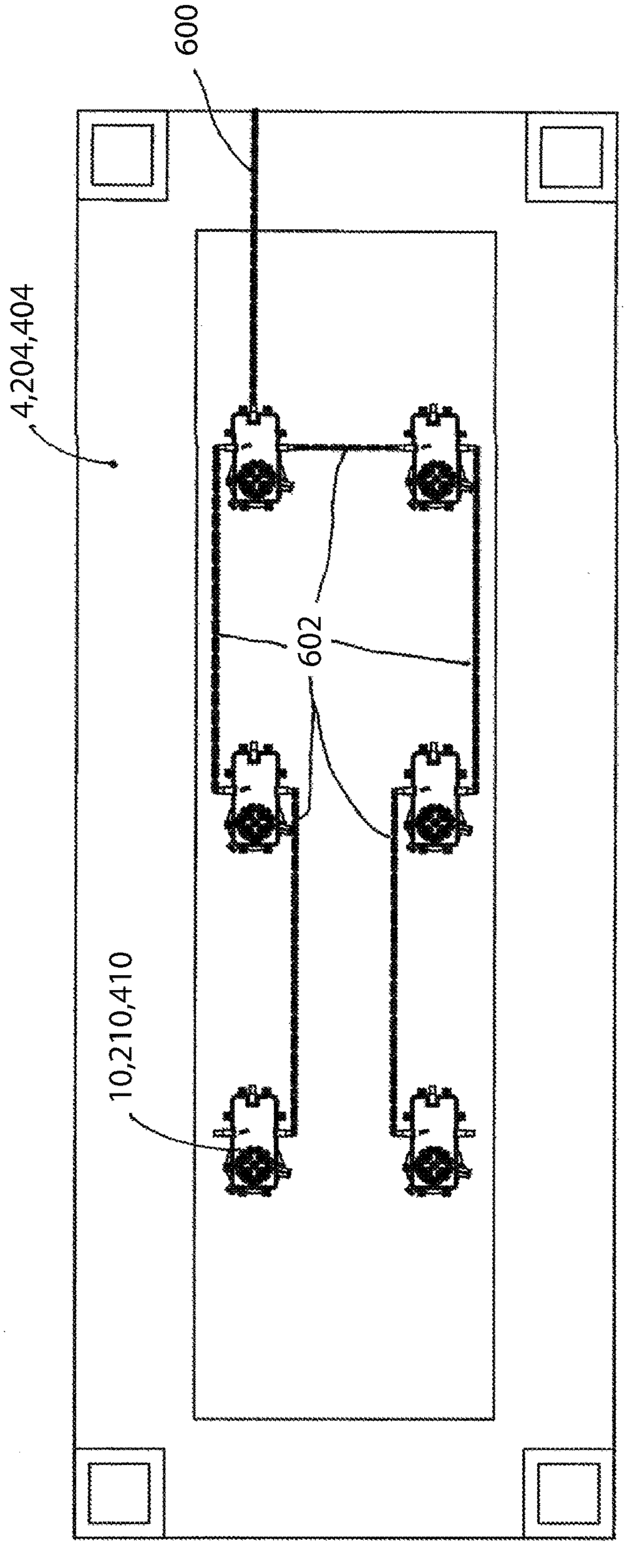
FIG. 28 is a plan view of several of the mounting arrangements illustrated in FIGS. 1, 9, and 18, mounted to the underside of a surface.

As illustrated in FIG. 28, several mounting arrangements 10, 210, 410 may be mounted on the underside of a surface 4, 204, 404, for example as illustrated in and described above with reference to FIGS. 8, 17, and 27. As illustrated, one of the mounting arrangements 10, 210, 410 may be connected to a mains power line 600, with the others being connected to one another (e.g., in one or more daisy-chain arrangements)

Those skilled in the art to which this invention pertains will readily appreciate that numerous changes, variations and modifications can be made without departing from the scope of the invention mutatis mutandis.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such tell is encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A mounting arrangement for securing a wireless power outlet having a primary inductive coil and components to an underside of a surface, the mounting arrangement comprising:

an electronics housing configured for containing the components therein;

a closed coil basin containing therein the primary inductive coil configured to be spaced apart from said electronics housing;

a lid configured to cover the coil basin; and a heat sink that is thermally connected to the primary inductive coil by a flexible thermal conductor and is configured to expel thermal energy, wherein the coil basin is spaced apart into an aperture formed within the surface, and wherein said heat sink comprises a base and a heat rejector thermally connected thereto by said flexible thermal conductor.

2. The mounting arrangement of claim 1, wherein said electronics housing comprises an arrangement of openings on three sides thereof.

3. The mounting arrangement of claim 2, wherein said openings are arranged to facilitate connecting the wireless power outlet to a source of power.

4. The mounting arrangement of claim 2, wherein said openings are arranged to facilitate connecting the wireless power outlet to other wireless power outlets.

5. The mounting arrangement of claim 1, wherein said heat rejector comprises a plurality of fins projecting therefrom.

6. The mounting arrangement of claim 5, wherein said electronic housing comprises a casing having apertures formed therein for allowing air to circulate within said plurality of fins.

* * * * *